(12) United States Patent
Ward

(10) Patent No.: US 9,795,087 B2
(45) Date of Patent: Oct. 24, 2017

(54) VARIABLE DIAMETER DISCHARGE SYSTEM

(71) Applicant: Gary Lee Ward, Twin Valley, MN (US)

(72) Inventor: Gary Lee Ward, Twin Valley, MN (US)

( * ) Notice: Subject to any disclaimer, the term of this patent is extended or adjusted under 35 U.S.C. 154(b) by 0 days.

(21) Appl. No.: 15/420,205

(22) Filed: Jan. 31, 2017

(65) Prior Publication Data

US 2017/0247183 A1 Aug. 31, 2017

Related U.S. Application Data

(60) Provisional application No. 62/300,733, filed on Feb. 26, 2016.

(51) Int. Cl.
*A01F 25/18* (2006.01)
*B65D 88/28* (2006.01)
*B65D 88/02* (2006.01)

(52) U.S. Cl.
CPC ............ *A01F 25/186* (2013.01); *B65D 88/02* (2013.01); *B65D 88/28* (2013.01)

(58) Field of Classification Search
CPC ... B65G 69/0441; A01F 25/183; A01F 25/186
USPC ....................... 141/67, 286; 406/19, 159, 163
See application file for complete search history.

(56) References Cited

U.S. PATENT DOCUMENTS

| 3,390,918 A * | 7/1968 | Reinke | A01F 25/186 406/159 |
| 4,396,045 A * | 8/1983 | Cain | B65B 39/04 141/286 |
| 8,925,578 B2 * | 1/2015 | Lee | F16K 3/03 137/527 |

* cited by examiner

*Primary Examiner* — Timothy L Maust
*Assistant Examiner* — Timothy P Kelly
(74) *Attorney, Agent, or Firm* — Neustel Law Offices

(57) ABSTRACT

A variable diameter discharge system for controlling the flow and distribution of a material being fed into a bin. The variable diameter discharge system generally includes a storage bin including a bin opening for receiving a material to be stored in the storage bin. A hopper is suspended beneath the bin opening such that materials fed into the bin opening pass through the hopper. A ring member is connected to the hopper which includes a plurality of guide members adjustable between a first position and a second position. An opening is defined between the guide members; with the opening enlarging as the guide members are adjusted toward the second position. Springs connected between the guide members and the ring member bias the guide members toward the first position. The guide members move from the first position to the second position when a material is flowing through the opening.

18 Claims, 21 Drawing Sheets

VARIABLE DIAMETER DISCHARGE SYSTEM

CROSS REFERENCE TO RELATED APPLICATIONS

I hereby claim benefit under Title 35, United States Code, Section 119(e) of U.S. provisional patent application Ser. No. 62/300,733 filed Feb. 26, 2016. The application 62/300,733 is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a variable diameter discharge system for controlling the flow and distribution of a material being fed into a bin.

Related Art

Any discussion of the related art throughout the specification should in no way be considered as an admission that such related art is widely known or forms part of common general knowledge in the field.

Material storage bins have been in use for many years to receive and store materials such as grain and the like. Such material storage bins are often filled via a bin opening through which the materials are fed, such as by an auger. FIG. 1 illustrates an exemplary material storage bin of the prior art which is commonly used.

As shown in FIG. 1, simply feeding materials through an unregulated bin opening may result in faster feeding of the material, but will typically result in uneven distribution of the materials within the bottom of the bin. FIG. 1 illustrates that materials are collecting toward the right side of the material storage bin in an uneven manner. This will result in uneven distribution of materials within the material storage bin, which can prevent the bin from efficiently storing materials. This may also lead to uneven weight distribution within the material storage bin which could affect the structural stability of the bin.

SUMMARY

An example embodiment is directed to a variable diameter discharge system. The variable diameter discharge system includes a storage bin including a bin opening for receiving a material to be stored in the storage bin. A hopper is suspended beneath the bin opening such that materials fed into the bin opening pass through the hopper. A ring member is connected to a lower end of the hopper. The ring member includes a plurality of guide members which are adjustable between a first position and a second position. An opening is defined between the outer ends of the guide members; with the opening being adapted to enlarge as the guide members are adjusted toward the second position. Springs connected between the guide members and the ring member bias the guide members toward the first position. The guide members are adapted to move from the first position to the second position when a material is flowing through the opening.

There has thus been outlined, rather broadly, some of the embodiments of the variable diameter discharge system in order that the detailed description thereof may be better understood, and in order that the present contribution to the art may be better appreciated. There are additional embodiments of the variable diameter discharge system that will be described hereinafter and that will form the subject matter of the claims appended hereto. In this respect, before explaining at least one embodiment of the variable diameter discharge system in detail, it is to be understood that the variable diameter discharge system is not limited in its application to the details of construction or to the arrangements of the components set forth in the following description or illustrated in the drawings. The variable diameter discharge system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
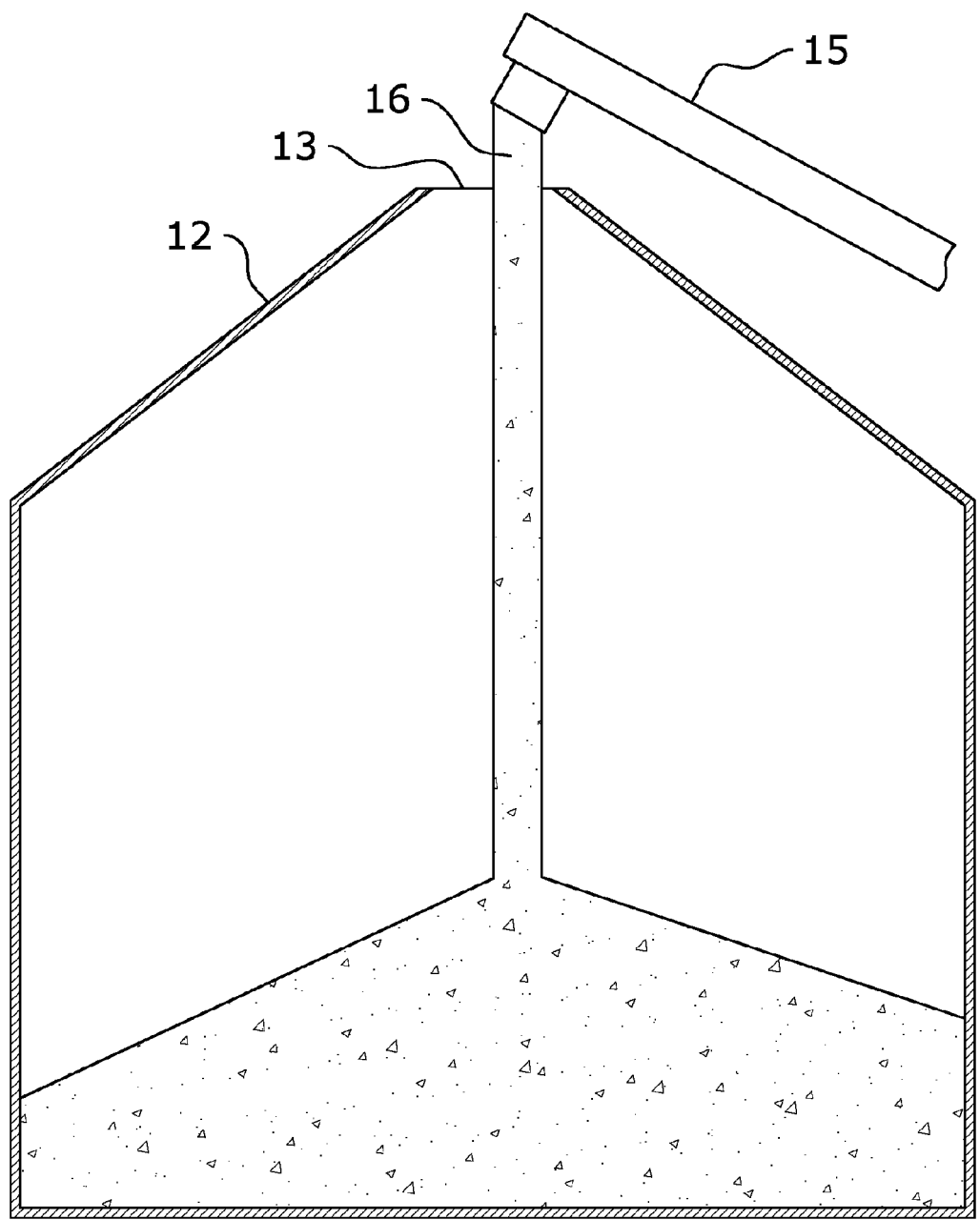
FIG. 1 is a sectional view of a material storage bin being loaded via a prior art method and system.

A. Overview.

An example variable diameter discharge system generally comprises a storage bin 12 including a bin opening 13 for receiving a material 16 to be stored in the storage bin 12. A hopper 20 is suspended beneath the bin opening 13 such that materials 16 fed into the bin opening 13 pass through the hopper 20. A ring member 30 is connected to a lower end 22 of the hopper 20. The ring member 30 includes a plurality of guide members 44 which are adjustable between a first position and a second position. An opening 47 is defined between the outer ends 45 of the guide members 44, with the opening 47 being adapted to enlarge as the guide members 44 are adjusted toward the second position. Springs 41 connected between the guide members 44 and the ring member 30 bias the guide members 44 toward the first position. The guide members 44 are adapted to move from the first position to the second position when a material 16 is flowing through the opening 47.

It should be appreciated that the present invention is not intended to be limited to controlling flow of materials 16 into a material storage bin 12. The figures and descriptions herein are merely for exemplary purposes. The methods and systems described herein could be used for any type of material transfer, such as from an auger to a container, from a container to another container, from a conduit to a container, or from a conduit to another conduit, among others. Thus, the present invention should not be construed as being limited to feeding materials 16 into a material storage bin 12.

B. Material Storage Bin.

The figures illustrate an exemplary material storage bin 12 which is adapted to receive and store materials 16 such as grain or the like. The material storage bin 12 may include a bin opening 13 through which materials 16 are fed either manually or by a feeder 15 such as an auger. It should be appreciated that the bin opening 13 may be positioned at various locations on the material storage bin 12, and should not be construed as limited to an upper portion of the material storage bin 12 as shown in the exemplary figures.

FIGS. 2-4 and 15 illustrate an exemplary material storage bin 12 which may be utilized with the present invention. The shape, structure, size, and configuration of the material storage bin 12 should not be construed as limited by the exemplary figures. Any type of material storage bin 12 may be utilized; and different sizes are anticipated to suit different purposes.

While the figures illustrate that the ring member 30 is suspended beneath the bin opening 13 of the material storage bin 12, it should be appreciated that the ring member 30 may in some embodiments be positioned on the material storage bin 12 itself; with a separate bin opening 13 not being necessary in such embodiments.

C. Hopper.

As best shown in FIGS. 2-5c and 9-12, a hopper 20 may be utilized to direct material flow to the ring member 30. It should be appreciated that some embodiments of the present invention do not utilize a hopper 20. In such embodiments, the ring member 30 may be directly connected to the hopper 20 and materials 16 fed directly through the ring member 30.

Figure 4:
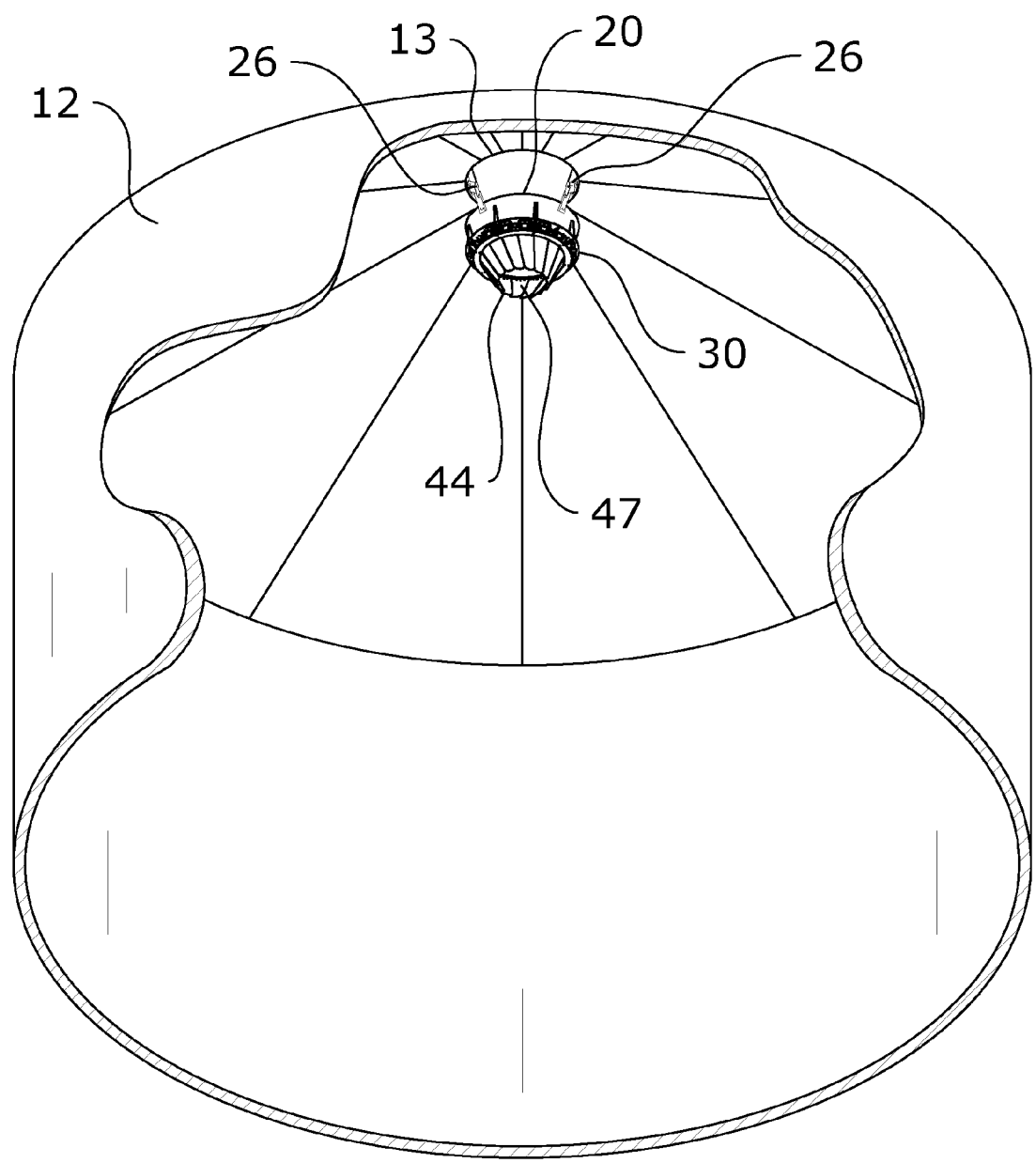
FIG. 4 is a cutaway view of a variable diameter discharge system in accordance with an example embodiment.

In embodiments which utilize a hopper 20, the hopper 20 will generally be positioned near the bin opening 13 of the material storage bin 12. In the embodiment shown in the figures, the hopper 20 is suspended beneath the bin opening 13 such that materials 16 fed through the bin opening 13 fall through the orifice 24 of the hopper 20 and into the ring member 30. Thus, an upper end 21 of the hopper 20 will generally be positioned beneath the bin opening 13; with the lower end 22 of the hopper 20 being connected to the ring member 30 as shown in FIG. 4. The hopper 20 may taper inwardly from its upper end 21 to its lower end 22 as shown in the figures.

The hopper 20 (or ring member 30) may be connected near the bin opening 13 in various manners. The figures illustrate exemplary methods of connecting the hopper 20 or ring member 30 near the bin opening 13. These exemplary methods are merely for illustrative purposes and should not be construed as limiting on the scope of the invention.

Figure 13:
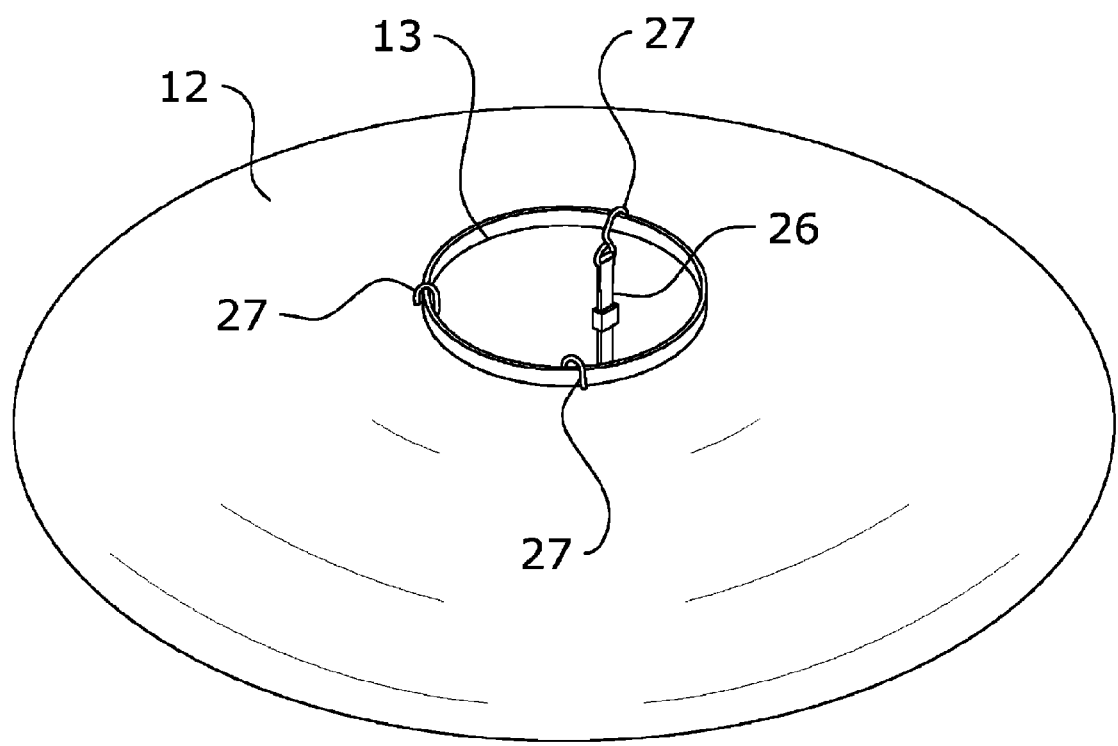
FIG. 13 is an upper perspective view of straps connected to a bin opening in accordance with an example embodiment.
Figure 14:
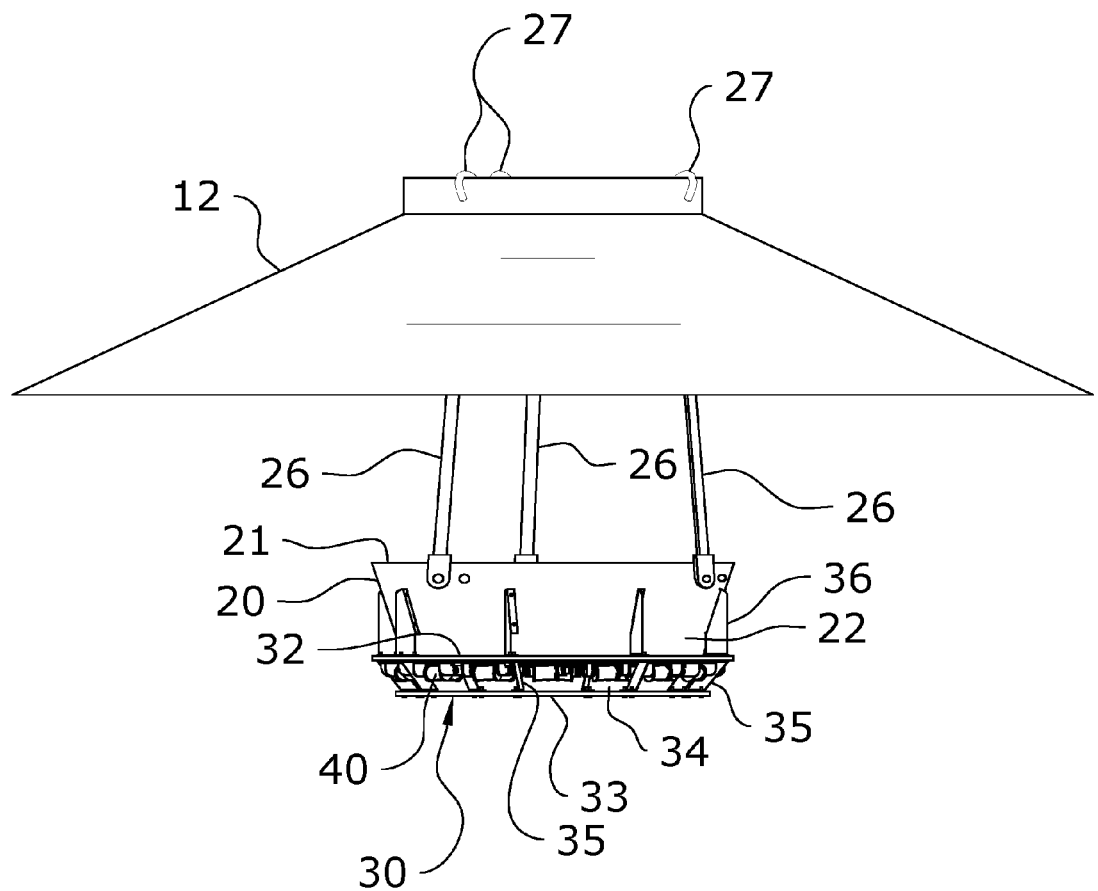
FIG. 14 is a side perspective view of a variable diameter discharge system suspended from a bin opening via straps in accordance with an example embodiment.

The hopper 20 may include mounting openings 25 to receive straps 26, rods 28, or other structures that allow the hopper 20 to be suspended from the bin opening 13. FIGS. 13 and 14 best illustrate use of straps 26 for suspending the hopper 20 from the bin opening 13. In such an embodiment, a plurality of straps 26 are connected between the mounting openings 25 of the hopper 20 and the bin opening 13 of the material storage bin 12. As shown in the figures, each strap 26 may include a hook 27 which latches around the outer edge of the bin opening 13 of the material storage bin 12. The straps 26 may be length-adjustable so that the positioning of the hopper 20 and ring member 30 with respect to the bin opening 13 may be adjusted to suit different needs.

Figure 15:
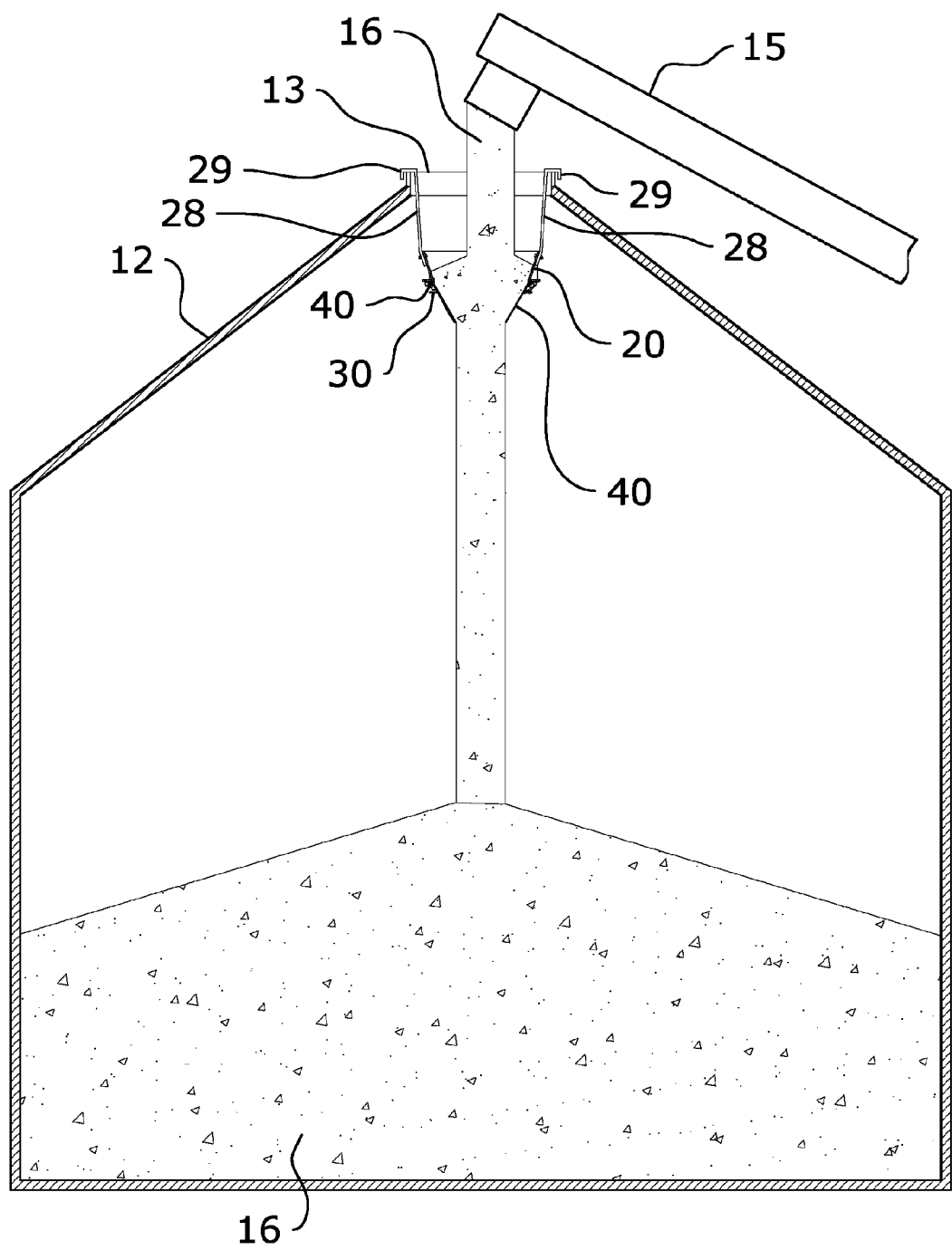
FIG. 15 is a side sectional view of a variable diameter discharge system filling a material storage bin in accordance with an example embodiment.
Figure 16:
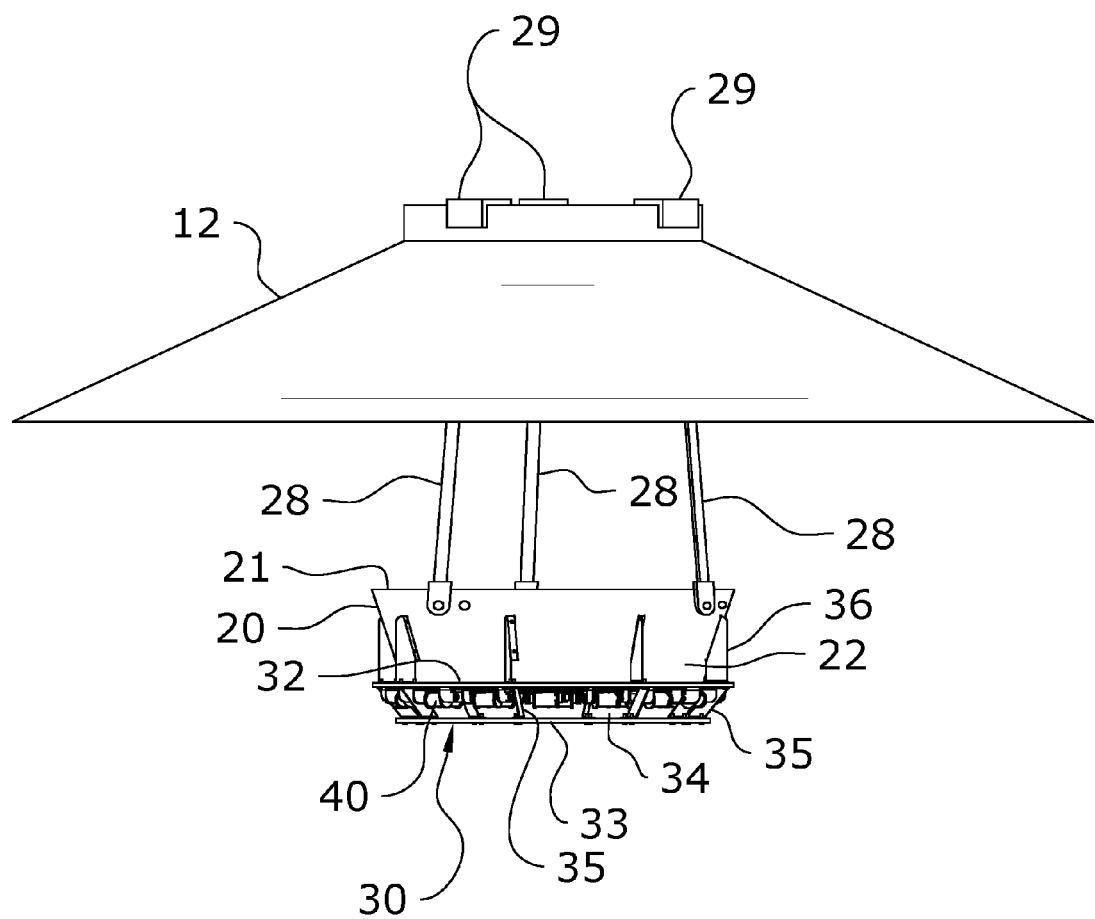
FIG. 16 is a side perspective view of a variable diameter discharge system suspended from a bin opening via rods in accordance with an example embodiment.

FIGS. 15 and 16 best illustrate use of rods 28 for suspending the hopper 20 from the bin opening 13. In such an embodiment, a plurality of rods 28 are connected between the mounting openings 25 of the hopper 20 and the bin opening 13 of the material storage bin 12. As shown in the figures, each rod 28 may include a rod bracket 29 which latches around the outer edge of the bin opening 13 of the material storage bin 12.

D. Ring Member.

Figure 17:
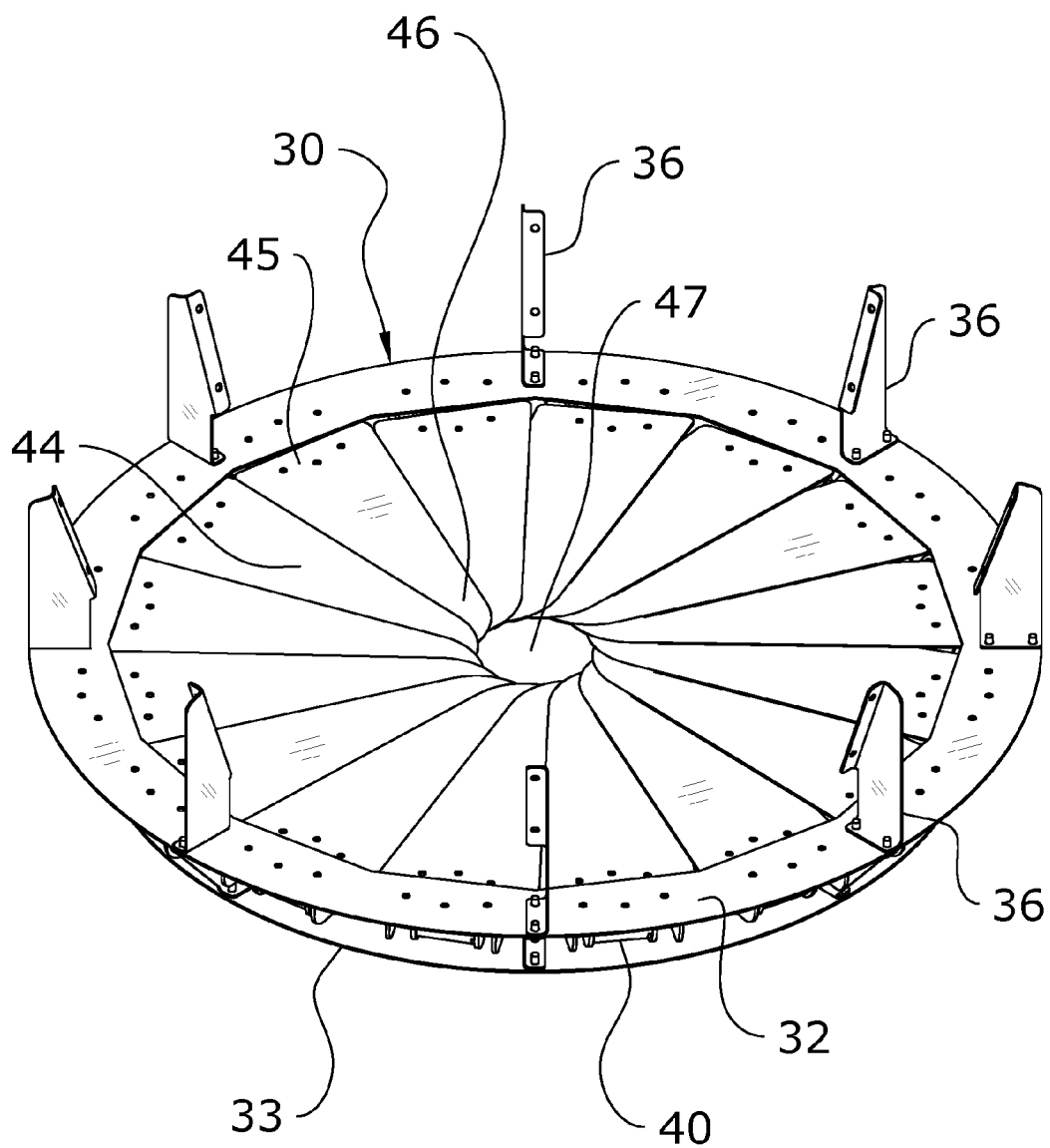
FIG. 17 is an upper perspective view of a variable diameter discharge system with the guide members in a first position in accordance with an example embodiment.

As best shown in FIG. 17, a ring member 30 is utilized to house the guide members 44 which are adapted to adjust in response to flow of materials 16 through the ring member 30. The shape, structure, and configuration of the ring member 30 may vary in different embodiments. The figures illustrate the ring member 30 as comprising a circular shape. It should be appreciated that other shapes may be utilized in some embodiments, such as a square-shape, a triangular-shape, an ovular-shape, and the like.

The figures illustrate an exemplary embodiment of a ring member 30. In such an exemplary embodiment, the ring member 30 comprises an upper ring 32, a lower ring 33, and a gap 34 which is defined between the upper and lower rings 32, 33. A plurality of ring connectors 45 are connected between the upper and lower rings 32, 33 to ensure a uniform size of the gap 34 for the entire circumference of the ring member 30.

Such an embodiment allows the hinges 40, springs 41, and guide members 44 to be connected in the gap 34 between the upper and lower rings 32, 33. This provides additional stability to the guide members 44 and will provide some protection against materials 16 falling into the hinges 40 and potentially impacting their performance.

Figure 9:
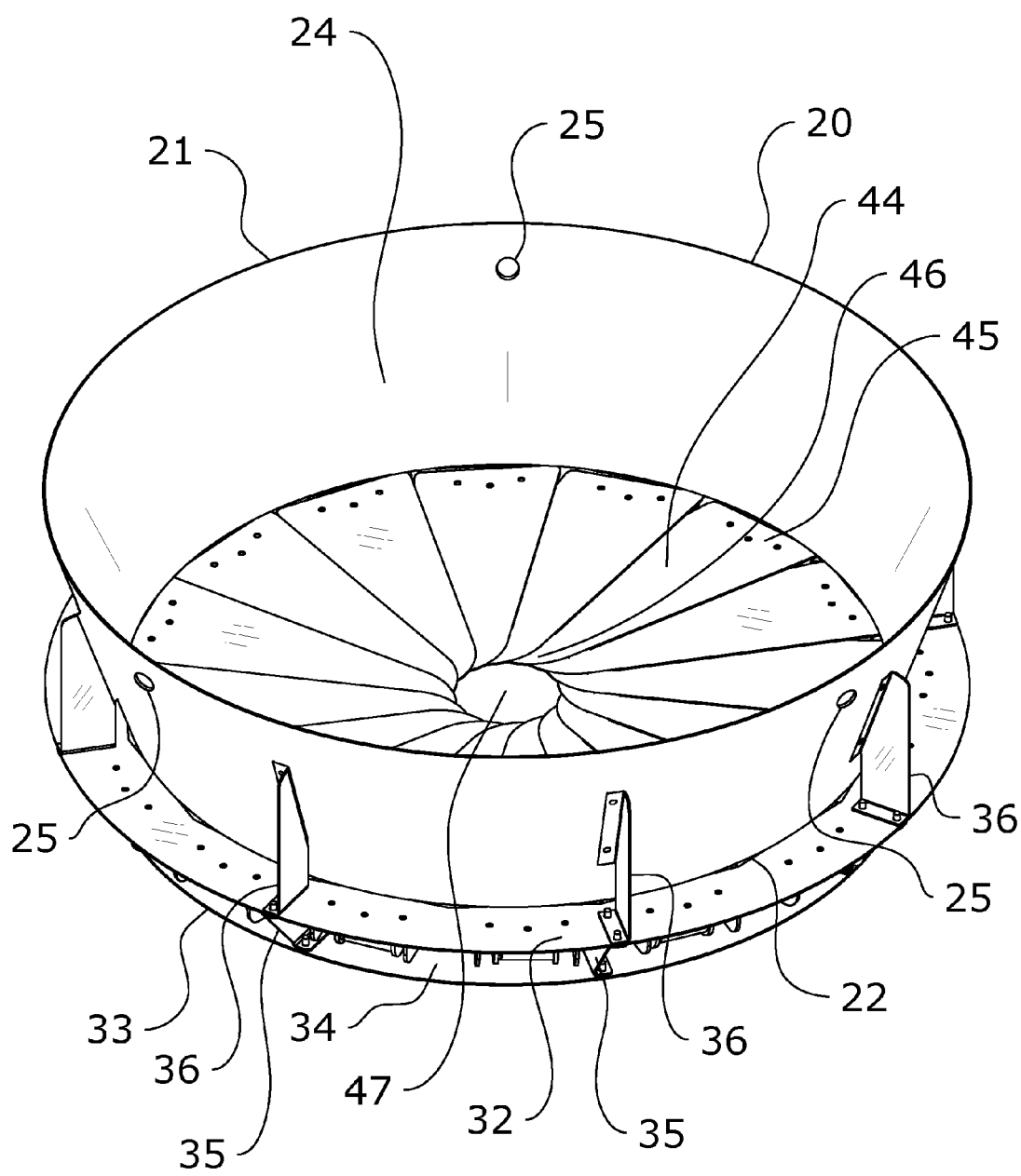
FIG. 9 is an upper perspective view of a variable diameter discharge system with the guide members in a first position in accordance with an example embodiment.
Figure 10:
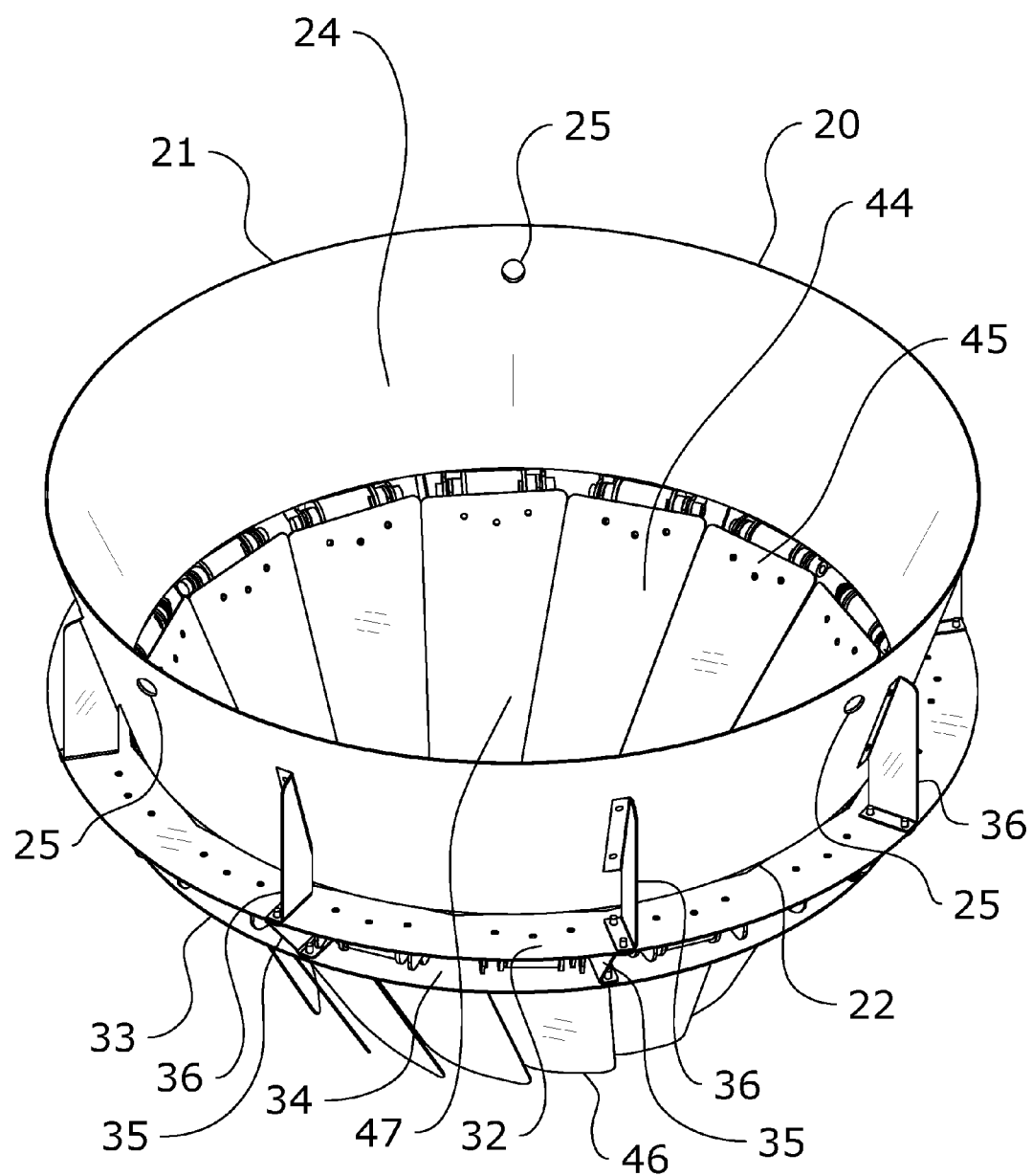
FIG. 10 is an upper perspective view of a variable diameter discharge system with the guide members in a second position in accordance with an example embodiment.
Figure 11:
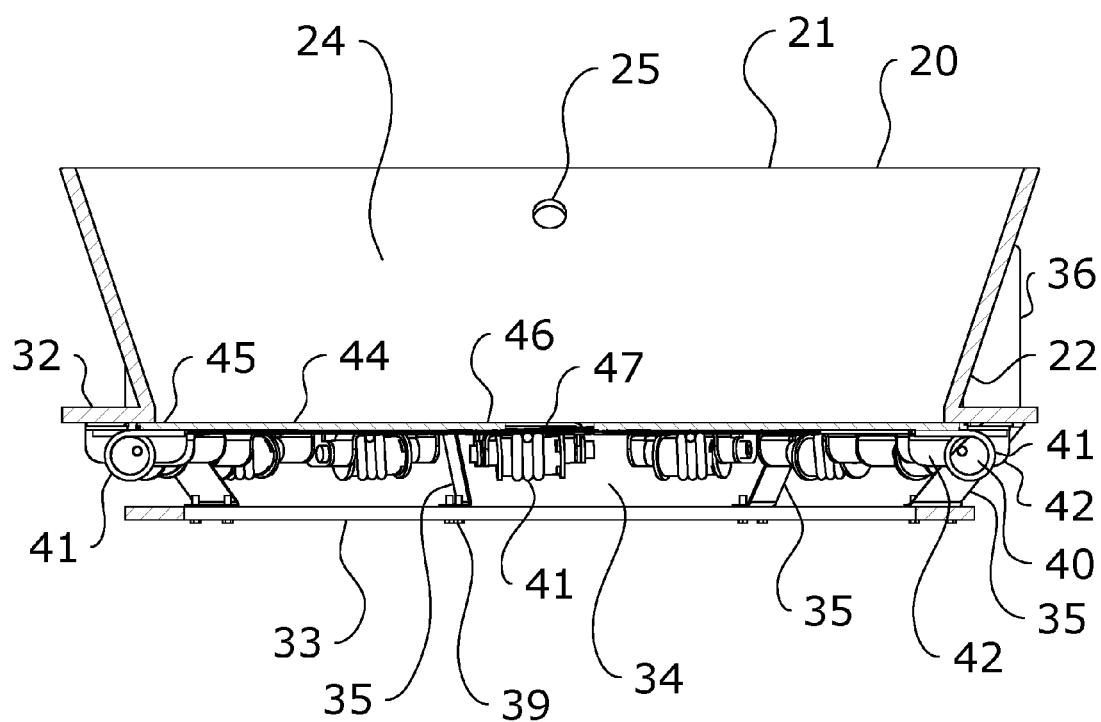
FIG. 11 is a side sectional view of a variable diameter discharge system with the guide members in a first position in accordance with an example embodiment.

The figures illustrate that the ring member 30 is connected to a hopper 20. As best shown in FIGS. 9 and 10, a plurality of hopper brackets 36 may be connected between the ring member 30 and the hopper 20. More specifically, the figures illustrate an exemplary embodiment in which such hopper brackets 36 are connected between the upper ring 32 of the ring member 30 and the hopper 20. In such an exemplary embodiment, a first end of each hopper bracket 36 is connected to the outer edge of the hopper 20 via fasteners 39 and a second end of the hopper bracket 36 is connected to the upper ring 32 of the ring member 30 via fasteners 39. In other embodiments, the hopper 20 and ring member 30 may be welded together or may be integrally formed of a unitary structure.

It should be appreciated that the hopper 20 may be omitted in some embodiments. In such embodiments, the ring member 30 may be connected directly to the material storage bin 12 rather than being connected near a discrete bin opening 13. Materials 16 fed into the material storage bin 12 will be fed directly through the ring member 30, rather than through a bin opening 13 and/or hopper 20 before reaching the ring member 30.

Figure 5A:
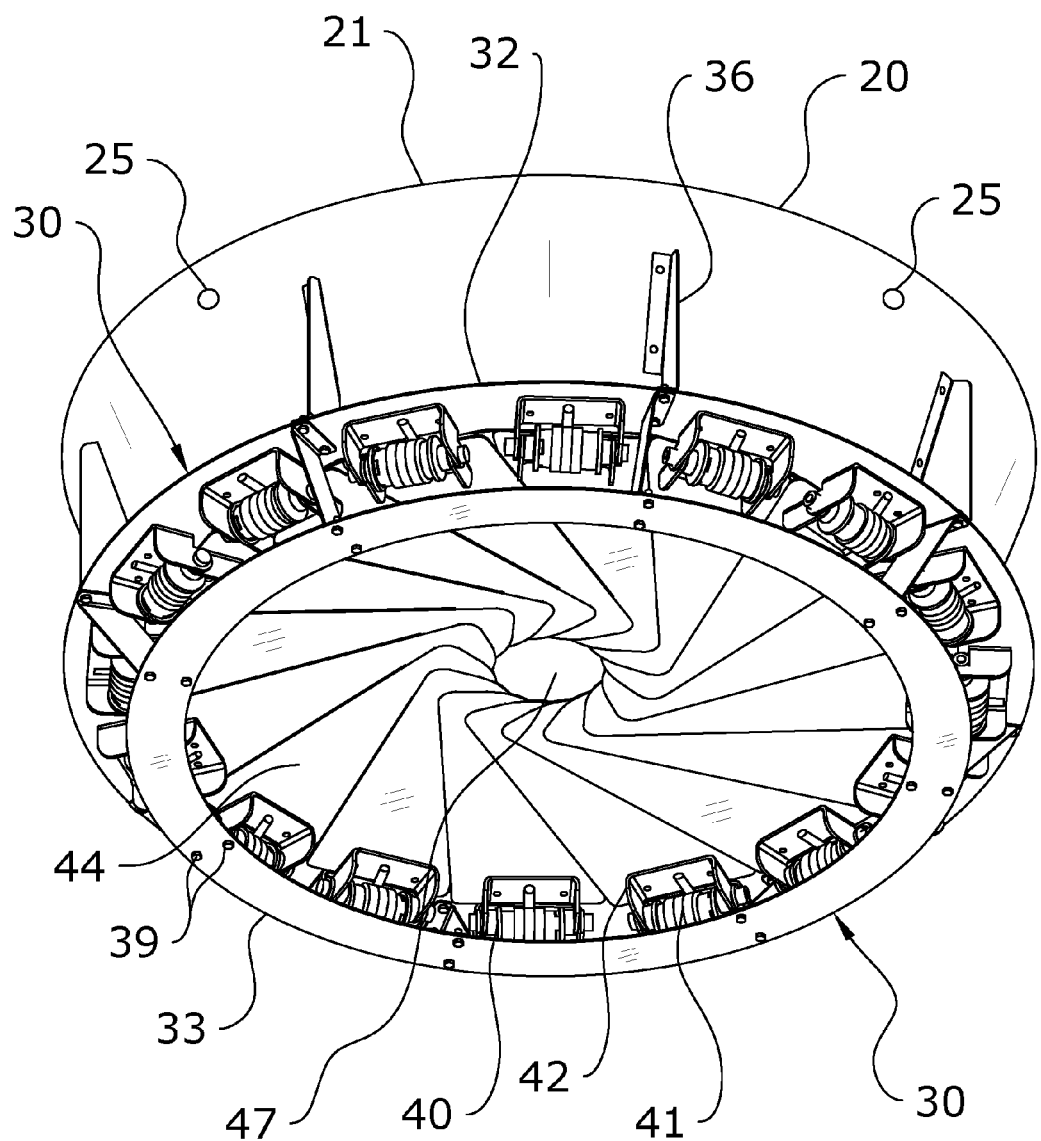
FIG. 5a is a lower perspective view of a variable diameter discharge system with the guide members in a first position in accordance with an example embodiment.
Figure 5B:
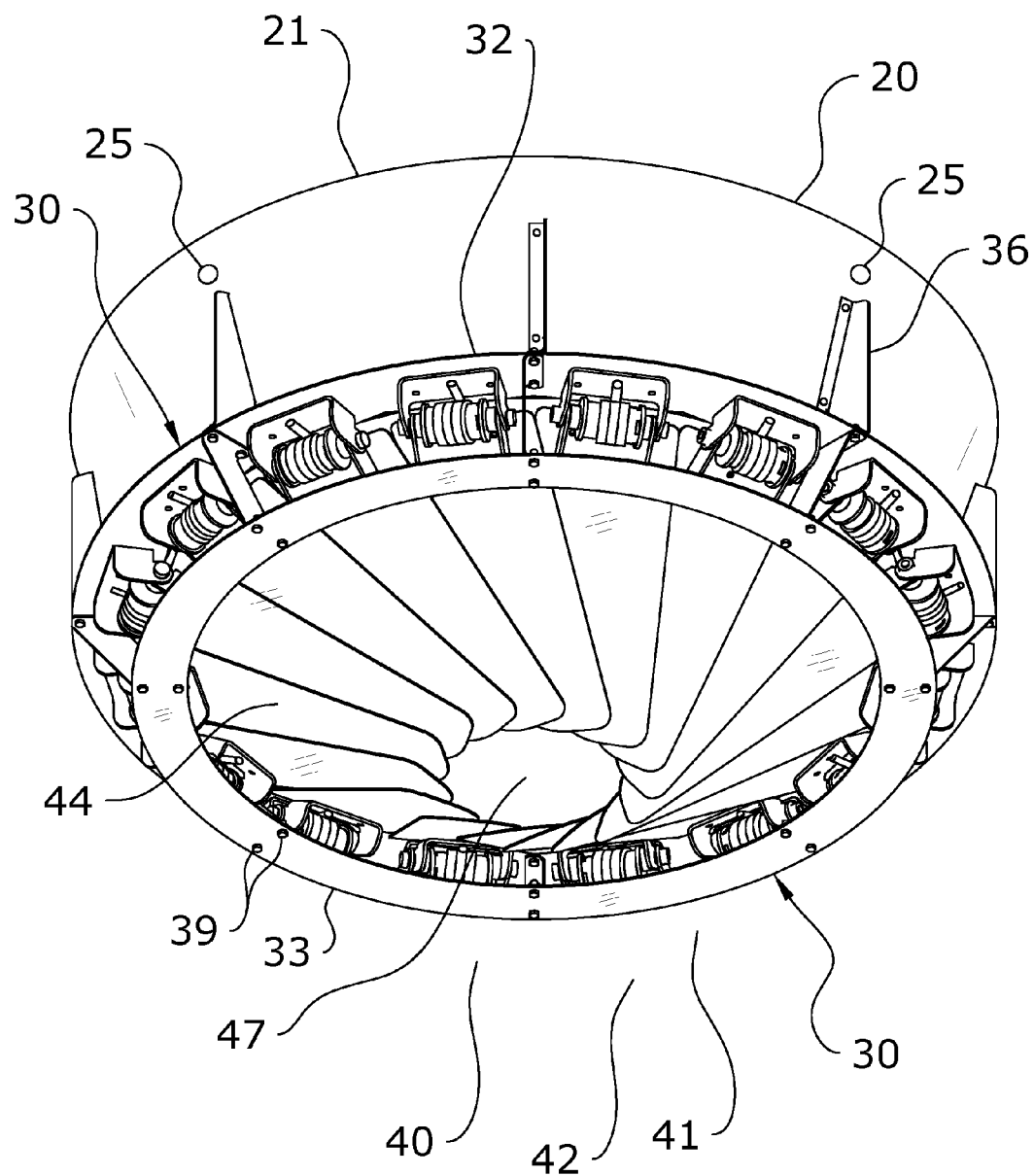
FIG. 5b is a lower perspective view of a variable diameter discharge system with the guide members in an intermediate position in accordance with an example embodiment.
Figure 5C:
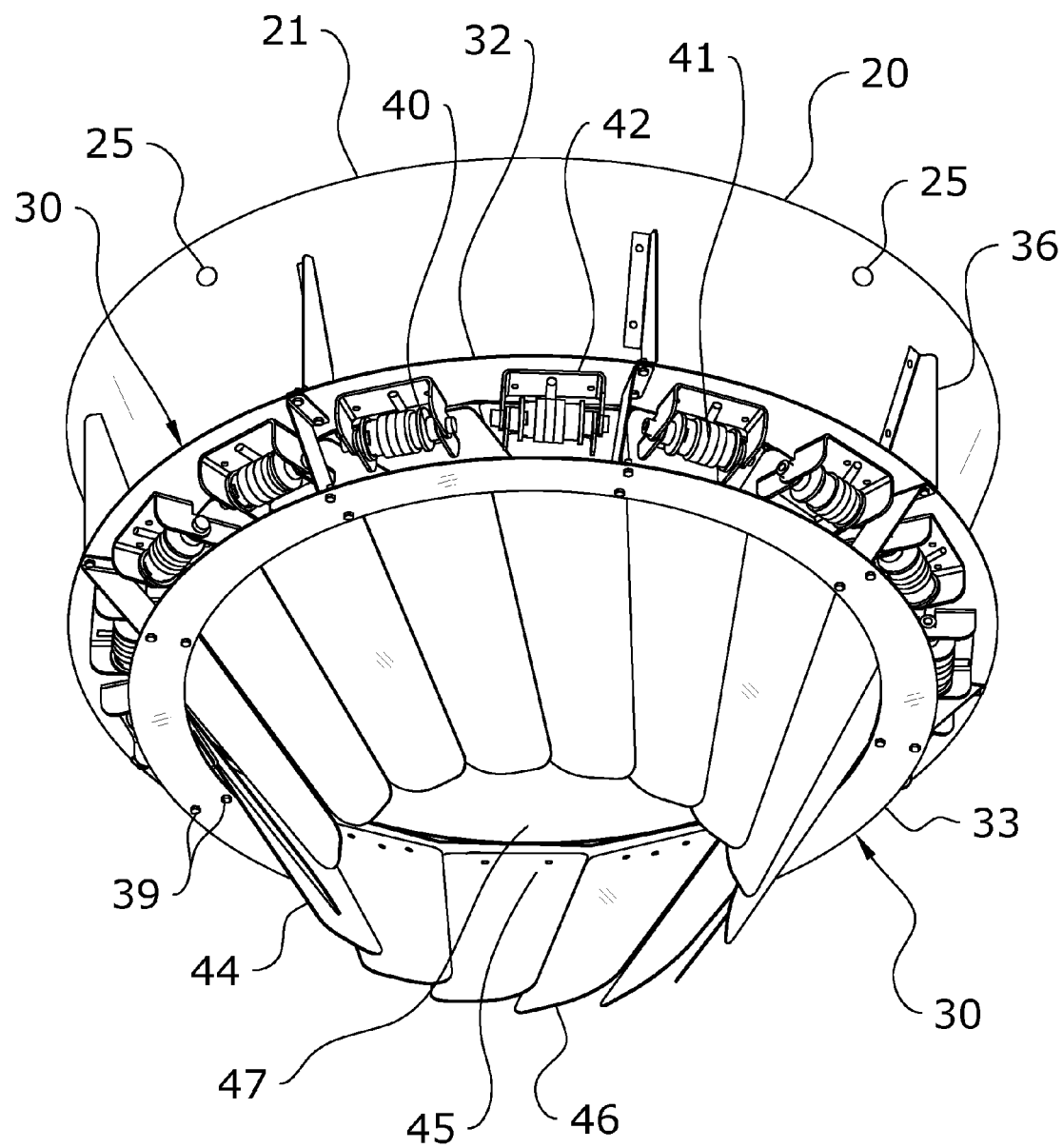
FIG. 5c is a lower perspective view of a variable diameter discharge system with the guide members in a second position in accordance with an example embodiment.
Figure 6:
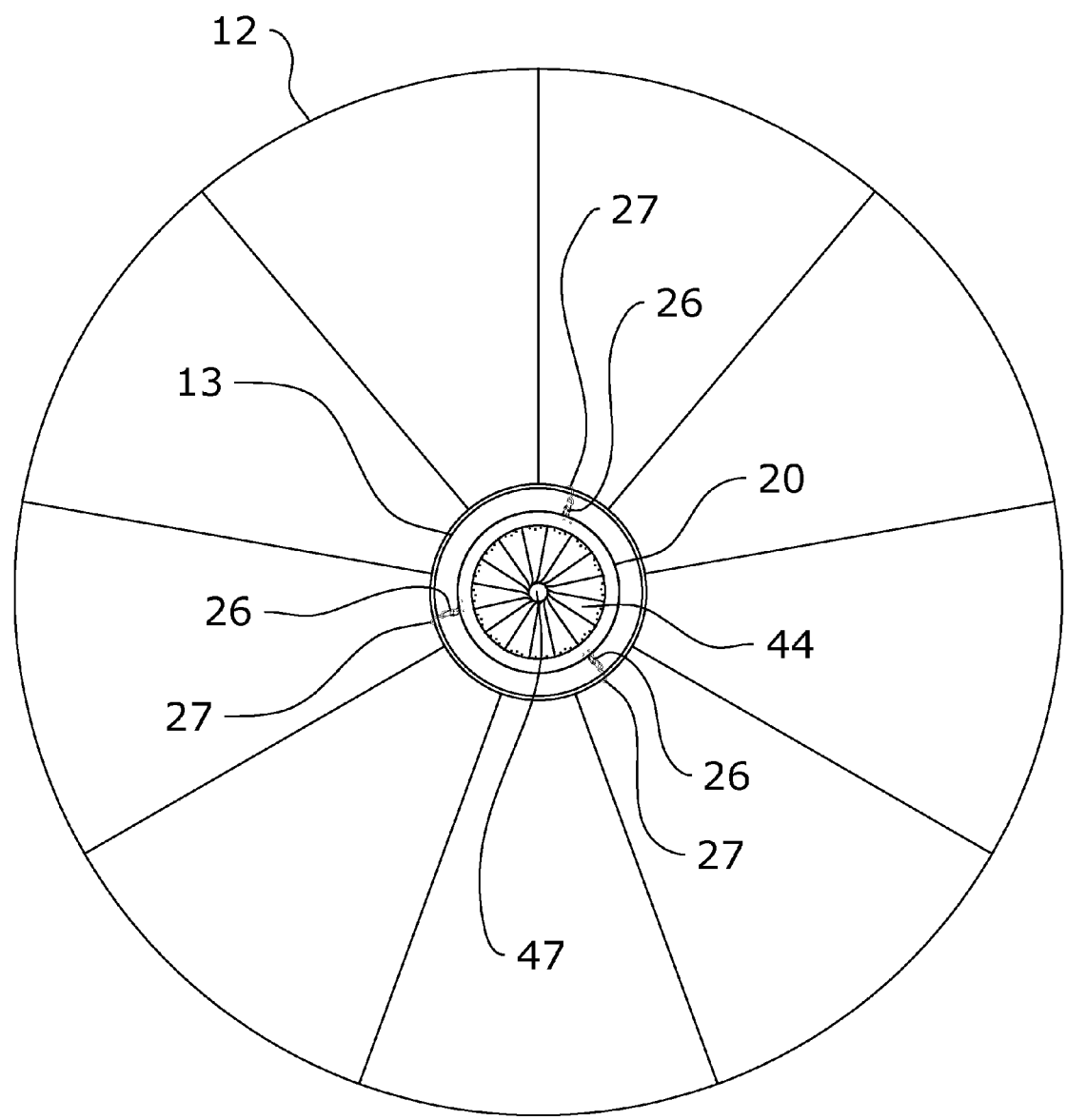
FIG. 6 is a top view of a variable diameter discharge system in accordance with an example embodiment.

As best shown in FIGS. 5a, 5b, and 5c, a plurality of guide members 44 are hingedly connected to the ring member 30. The shape, structure, and configuration of the guide members 44 may vary in different embodiments and should not be construed as limited by the figures. By way of example, the guide members 44 may comprise plates, fins, or the like. The guide members 44 may overlap with each other. The guide members 44 are adapted to be adjustable between a first position, which may be substantially horizontal, and a second position, which may be substantially vertical or diagonal, depending on the flow of materials 16 through the ring member 30.

As shown in the figures, each guide member 44 comprises an outer end 45 and an inner end 46. The outer end 45 of each guide member 44 is hingedly connected to the ring member 30. More specifically, in the exemplary embodiment of the figures, the outer end 45 of each guide member 44 is hingedly connected within the gap 34 between the upper and lower rings 32, 33 of the ring member 30. The guide members 44 may each be inwardly tapered from their outer ends 45 to their inner ends 46.

A central opening 47 is defined between the respective outer ends 45 of the guide members 44 such as shown in FIG. 5a-9. As material 16 flows through the ring member 30, the guide members 44 will be adjusted from the first position toward the second position depending on the volume and flow rate of the material 16.

Figure 7A:
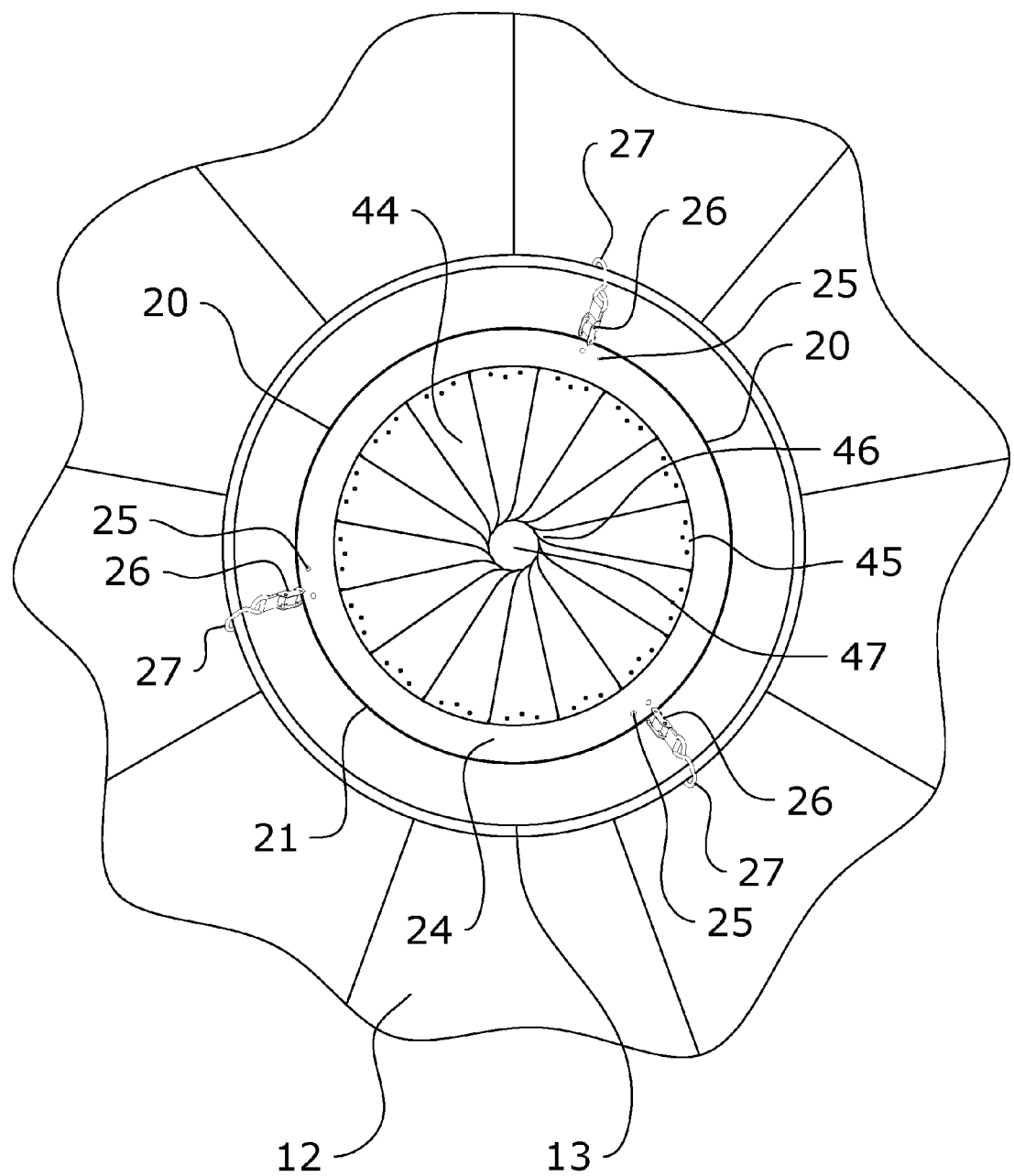
FIG. 7a is a top view of a variable diameter discharge system with the guide members in a first position in accordance with an example embodiment.

As the guide members 44 are adjusted, the size (diameter) of the central opening 47 will enlarge or reduce. FIGS. 5a, 7a, and 9 illustrate the central opening 47 being at its smallest diameter when the guide members 44 are in the first position. This first position of the guide members 44 is found when there is little to no material 16 flowing through the ring member 30.

Figure 7B:
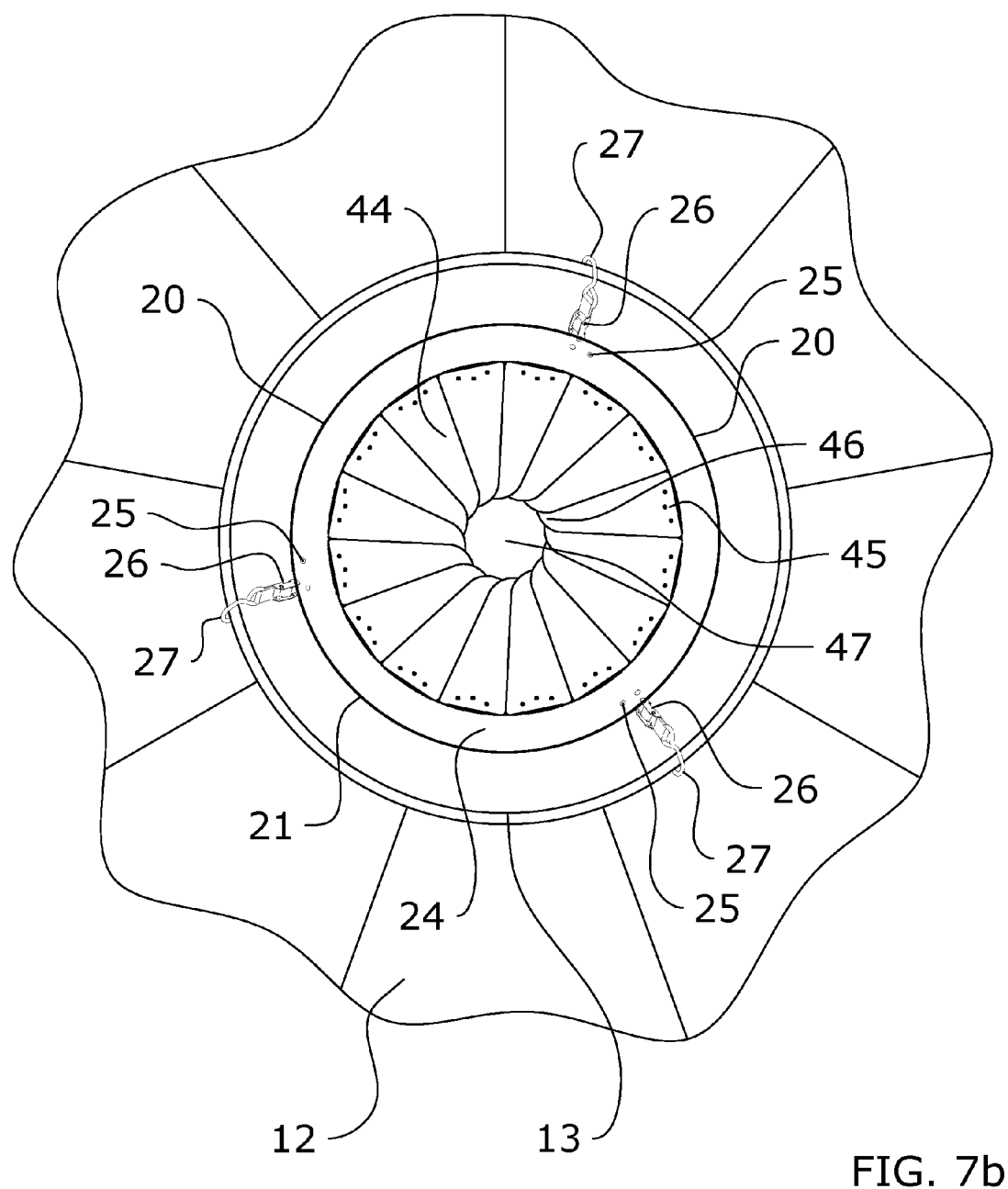
FIG. 7b is a top view of a variable diameter discharge system with the guide members in an intermediate position in accordance with an example embodiment.

FIGS. 5b and 7b illustrate an intermediate position of the guide members 44 between the first position and the second position. The central opening 47 is shown as being at an intermediate diameter when the guide members 44 are so positioned. The guide members 44 and central opening 47 will adjust into this position when a medium volume of material 16 or flow of material 16 is applied to the ring member 30.

FIGS. 5c and 7b illustrate a second position of the guide members 44 which is present when there is a heavy volume or flow of materials 16 through the ring member 30. As shown, the central opening 47 has enlarged to allow the high volume of materials 16 to pass therethrough.

FIGS. 5a, 5b, and 5c best illustrate exemplary hinges 40 which may be connected to the ring member 30. As shown in the figures, each guide member 44 is connected to a corresponding hinge 40. The hinges 40 may be connected to the ring member 30 by one or more hinge brackets 42. In the exemplary figures, the hinge brackets 42 are connected within the gap 34 between the upper and lower rings 32, 33, with the hinges 40 being connected within the hinge brackets 42.

As shown throughout the figures, the guide members 44 are preferably biased toward their first, substantially horizontal position. In other words, absent some application of force, the guide members 44 will automatically revert to the first position. Springs 41 may be provided to bias the guide members 44 toward the first position. Various types of springs 41 may be utilized, and the scope of the present invention should not be construed as limited by the exemplary springs 41 shown in the figures.

The springs 41 will preferably be adapted such that application of force to the guide members 44, such as by a material 16 passing through the ring member 30, will overcome the biasing force and adjust the guide members 44 toward the second position to enlarge the central opening 47. When such application of force is removed, such as in the case of the flow of material 16 ending, the guide members 44 will automatically be reverted back to the first position by the bias force of the springs 41.

E. Operation of Preferred Embodiment.

In use, the hopper 20 and/or ring member 30 are first connected near the bin opening 13 of the material storage bin 12. This step is omitted in embodiments in which the hopper 20 and/or ring member 30 are integrally formed with or fixedly connected (such as by welding) to the material storage bin 12.

In embodiments which utilize a hopper 20 and ring member 30, the hopper 20 is connected near the bin opening 13, such as by suspending the hopper 20 underneath the bin opening 13 by straps 26 as shown in FIGS. 13-14 or by suspending the hopper 20 underneath the bin opening 13 by rods 28 as shown in FIGS. 15-16. In embodiments with straps 26, the hooks 27 of each strap 26 are connected around the upper edge of the bin opening 13. The straps 26 may be adjusted so that the hopper 20 and ring member 30 are at the desired position with respect to the bin opening 13. In embodiments with rods 28, the rod brackets 29 of each rod 28 are connected around the upper edge of the bin opening 13. In embodiments without a hopper 20, the ring member 30 may be suspended in the same manner using straps 26 or rods 28.

Figure 2:
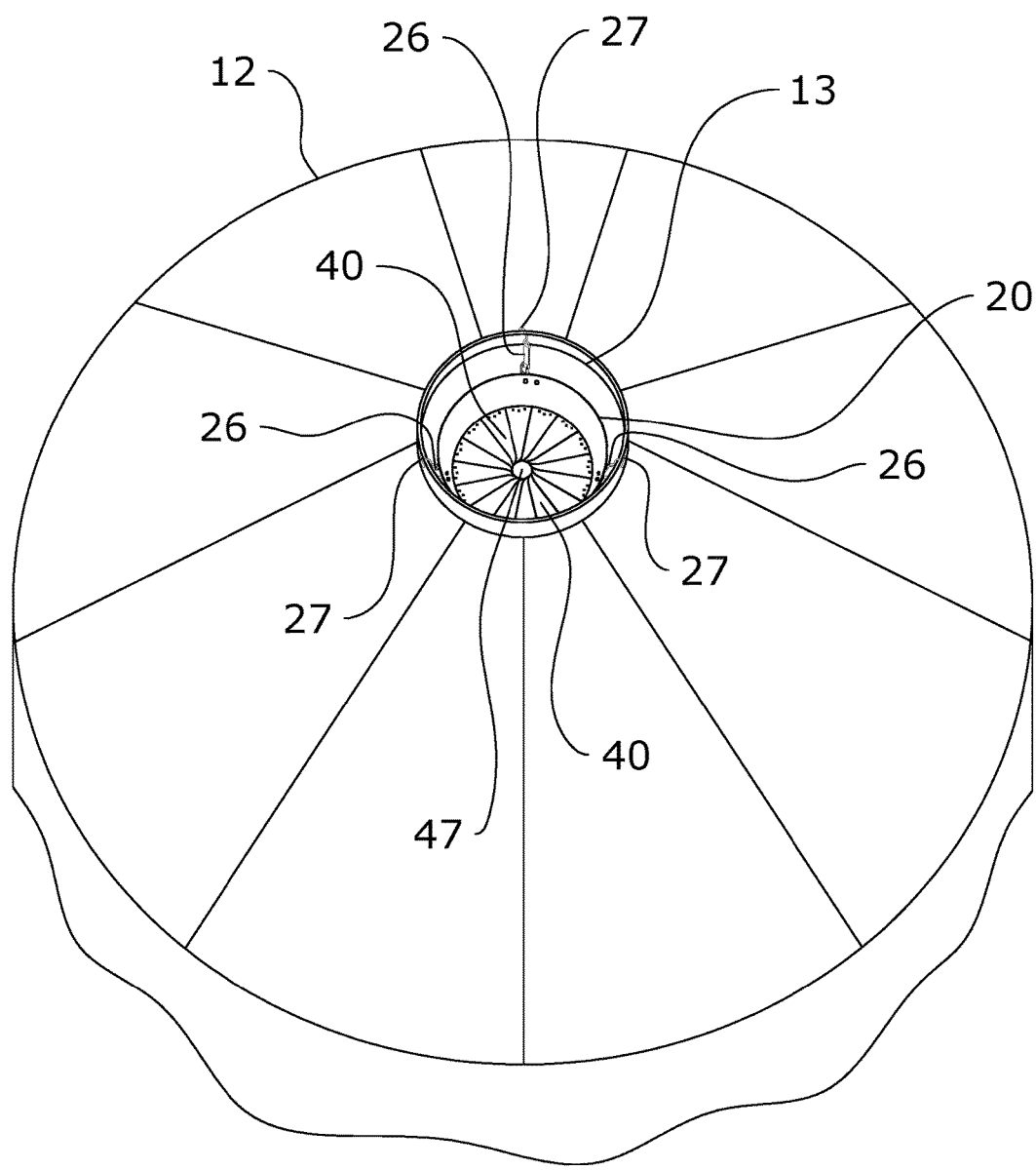
FIG. 2 is a perspective view of a variable diameter discharge system in accordance with an example embodiment.
Figure 3:
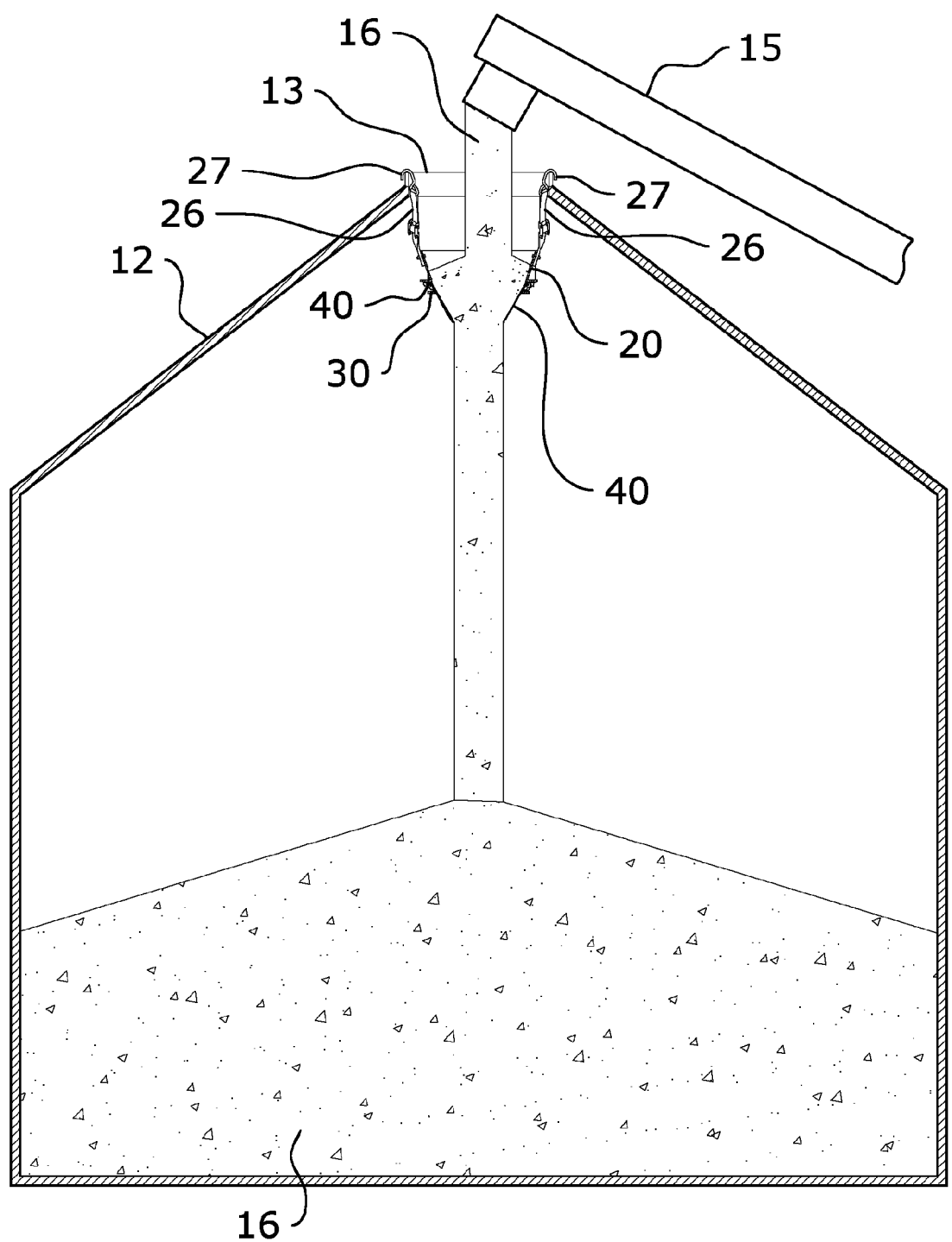
FIG. 3 is a sectional view of a variable diameter discharge system filling a material storage bin in accordance with an example embodiment.

FIGS. 2-4 best illustrate the hopper 20 and ring member 30 in place suspended beneath the bin opening 13. The material storage bin 12 may now be loaded with materials 16 as by a feeder 15 such as an auger. Materials 16 from the feeder 15 will first pass through the orifice 24 of the hopper 20, which will somewhat regulate flow and direct materials 16 into the ring member 30; particularly if there is a large volume or a heavy flow of materials 16 being fed through the bin opening 13.

As materials 16 flow into the ring member 30, the guide members 44 automatically adjust to regulate the flow and ensure an even distribution of materials 16 within the material storage bin 12. When there is minimal or no flow of materials 16 into the ring member 30, the guide members 44 will remain in their first, substantially horizontal position such as shown in FIGS. 5a and 7a. Materials 16 flowing through the central opening 47 will be distributed centrally into the material storage bin 12 to ensure even distribution of materials 16 within the material storage bin 12.

As the flow or volume of materials 16 into the ring member 30 increases, the guide members 44 automatically adjust downward via the hinges 40. As the guide members 44 adjust downwardly, the central opening 47 will increase in size to meter and control flow of the materials 16 through the ring member 30. FIGS. 5b and 7b illustrate intermediate positioning of the guide members 44 between the first and second positions to allow a medium flow of materials 16 through the ring member 30.

Figure 7C:
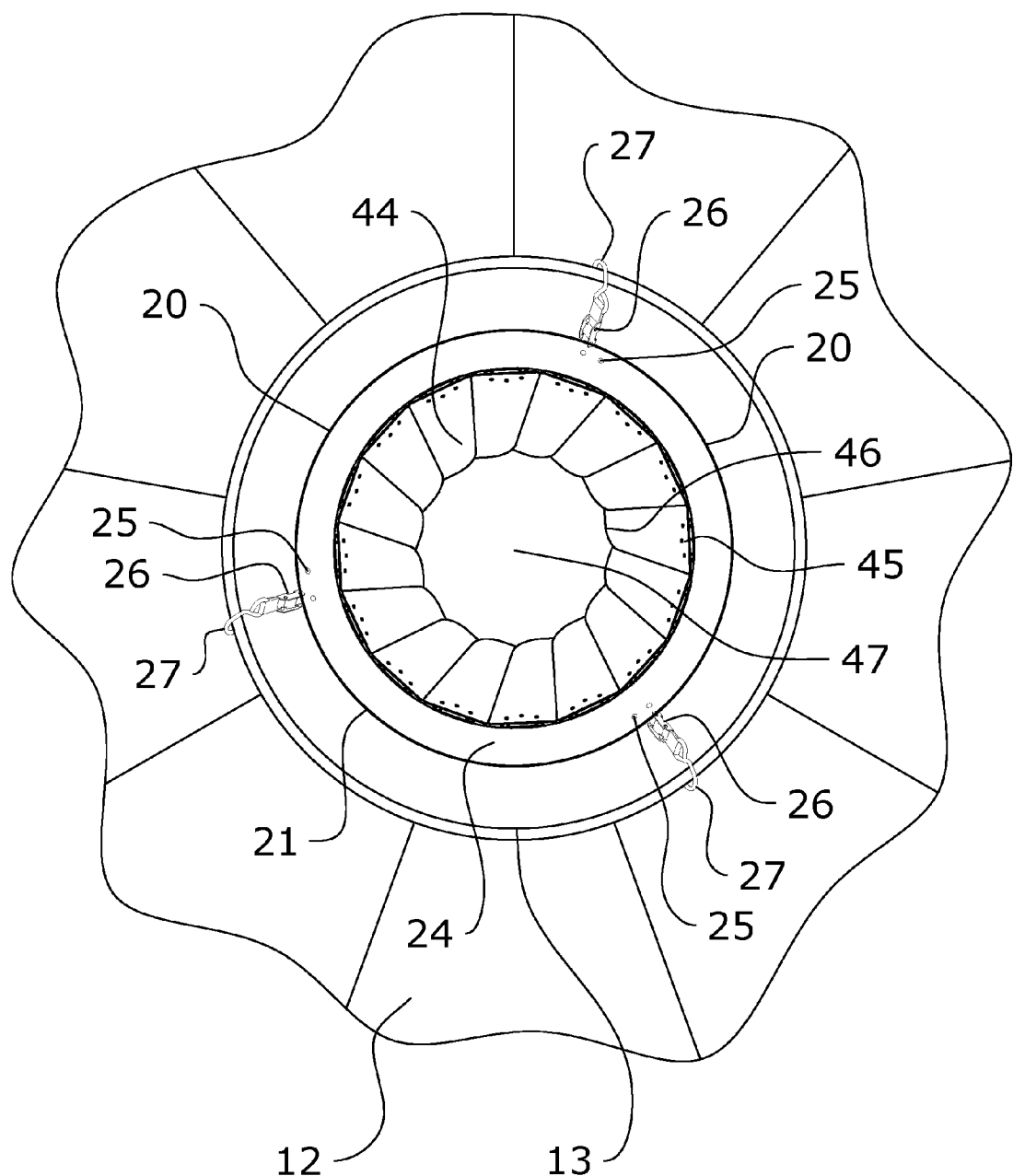
FIG. 7c is a top view of a variable diameter discharge system with the guide members in a second position in accordance with an example embodiment.
Figure 8:
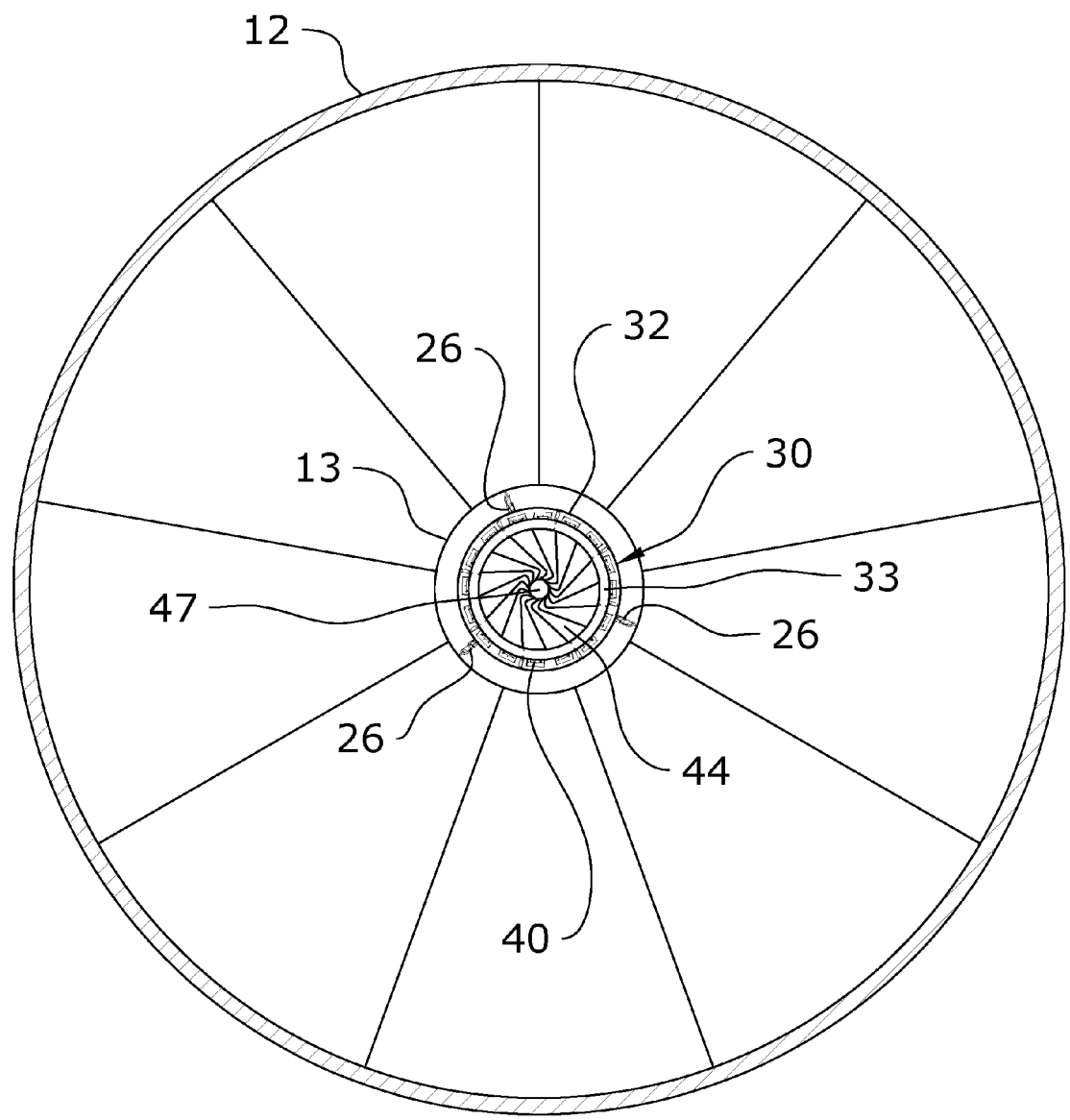
FIG. 8 is a bottom sectional view of a variable diameter discharge system in accordance with an example embodiment.
Figure 12:
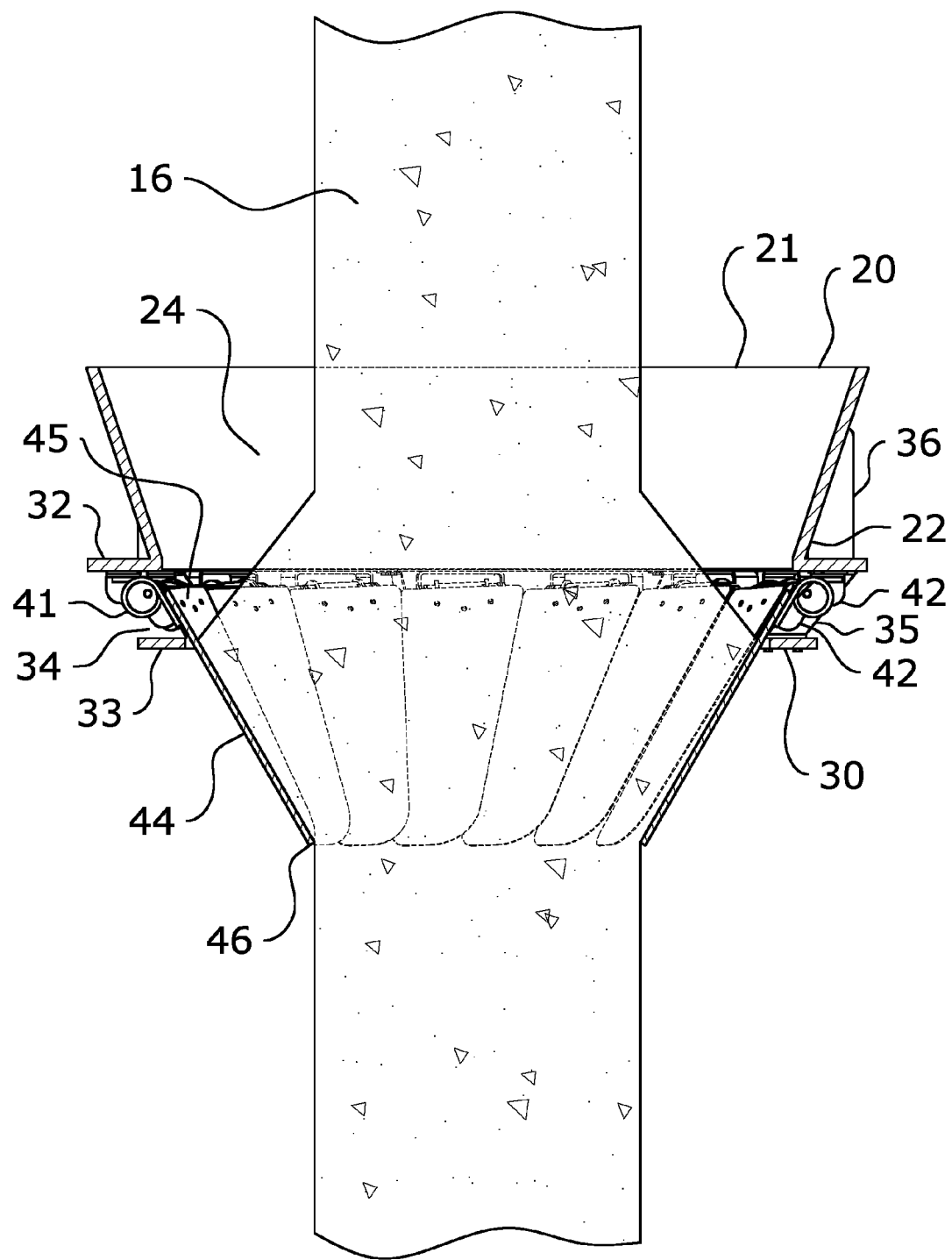
FIG. 12 is a side sectional view of a variable diameter discharge system with the guide members in a second position and materials flowing through the ring member in accordance with an example embodiment.

When the flow or volume of materials 16 is heavy, the guide members 44 automatically adjust into the second position. The second position may be diagonal in some embodiments or substantially vertical. When the guide members 44 are in the second position, the size of the central opening 47 is enlarged to allow a maximum flow of materials 16 in a manner which is still metered to be distributed evenly along the bottom of the material storage bin 12. FIGS. 5c and 7c illustrate the guide members 44 in the second position allowing maximum flow of materials 16 therethrough. FIG. 12 illustrates materials 16 flowing through the ring member 30 with the guide members 44 in the second position. FIGS. 3 and 15 illustrate even distribution of materials 16 in the material storage bin 12 due to flow control by the ring member 30 and guide members 44.

In the event that the flow reduces, the guide members 44 will automatically adjust upwardly due to the biasing force of the springs 41. Thus, the guide members 44 will adjust to reduce the size of the central opening 47 to regulate flow as the flow decreases, which ensures the continuing even distribution of materials 16 within the material storage bin 12. When the flow of materials 16 stops completely, the guide members 44 will have reverted back to their original, first position and the central opening 47 will have reduced back to its original size.

Unless otherwise defined, all technical and scientific terms used herein have the same meaning as commonly understood by one of ordinary skill in the art to which this invention belongs. Although methods and materials similar to or equivalent to those described herein can be used in the practice or testing of the variable diameter discharge system, suitable methods and materials are described above. All publications, patent applications, patents, and other references mentioned herein are incorporated by reference in their entirety to the extent allowed by applicable law and regulations. The variable diameter discharge system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A variable diameter discharge system, comprising:
   a ring member adapted to be connected near a bin opening of a storage bin;
   a hopper connected to an upper end of the ring member;
   a plurality of guide members each comprising an outer end and an inner end, wherein the inner end of each of the plurality of guide members is hingedly connected to the ring member, wherein each of the plurality of guide members is adjustable between a first position and a second position;
   an opening defined between the outer end of the plurality of guide members, wherein the opening is adapted to enlarge as the plurality of guide members are adjusted toward the second position; and
   a plurality of springs connected between each of the plurality of guide members and the ring member such that each of the plurality of guide members are biased toward the first position by the plurality of springs, wherein the plurality of guide members are adapted to move from the first position to the second position when a material is flowing through the opening.

2. The variable diameter discharge system of claim 1, wherein the ring member comprises a circular shape.

3. The variable diameter discharge system of claim 1, further comprising a plurality of hinges connected to the ring member, wherein the inner end of each of the plurality of guide members is connected to one of the plurality of hinges.

4. The variable diameter discharge system of claim 1, wherein the ring member comprises an upper ring, a lower ring, and a gap between the upper ring and the lower ring, wherein the inner end of each of the plurality of guide members is connected within the gap between the upper ring and the lower ring.

5. The variable diameter discharge system of claim 1, wherein the ring member is suspended beneath the bin opening of the storage bin.

6. The variable diameter discharge system of claim 5, further comprising a strap connected between the ring member and the storage bin.

7. The variable diameter discharge system of claim 5, further comprising a rod connected between the ring member and the storage bin.

8. The variable diameter discharge system of claim 1, wherein each of the plurality of guide members comprises a plate.

9. The variable diameter discharge system of claim 1, wherein each of the plurality of guide members is tapered inwardly from the outer end of the guide member to the inner end of the guide member.

10. The variable diameter discharge system of claim 1, wherein each of the plurality of guide members overlap with each other.

11. A variable diameter discharge system, comprising:
    a storage bin including a ring member;
    a hopper connected to an upper end of the ring member;
    a plurality of guide members each comprising an outer end and an inner end, wherein the inner end of each of the plurality of guide members is hingedly connected to the ring member, wherein each of the plurality of guide members is adjustable between a first position and a second position;
    an opening defined between the outer end of the plurality of guide members, wherein the opening is adapted to enlarge as the plurality of guide members are adjusted toward the second position; and a plurality of springs connected between each of the plurality of guide members and the ring member such that each of the plurality of guide members are biased toward the first position by the plurality of springs, wherein the plurality of guide members are adapted to move from the first position to the second position when a material is flowing through the opening.

12. The variable diameter discharge system of claim 11, further comprising a plurality of hinges connected to the ring member.

13. The variable diameter discharge system of claim 12, wherein the inner end of each of the guide members is connected to one of the plurality of hinges.

14. The variable diameter discharge system of claim 11, wherein the ring member comprises an upper ring, a lower ring, and a gap between the upper ring and the lower ring.

15. The variable diameter discharge system of claim 14, wherein the inner end of each of the plurality of guide members is connected within the gap between the upper ring and the lower ring.

16. A variable diameter discharge system, comprising:
a storage bin including a bin opening for receiving a material to be stored in the storage bin;
a hopper suspended beneath the bin opening;
a ring member connected to a lower end of the hopper;
a plurality of guide members each comprising an outer end and an inner end, wherein the inner end of each of the plurality of guide members is hingedly connected to the ring member, wherein each of the plurality of guide members is adjustable between a first position and a second position;
an opening defined between the outer end of the plurality of guide members, wherein the opening is adapted to enlarge as the plurality of guide members are adjusted toward the second position; and
a plurality of springs connected between each of the plurality of guide members and the ring member such that each of the plurality of guide members are biased toward the first position by the plurality of springs, wherein the plurality of guide members are adapted to move from the first position to the second position when a material is flowing through the opening.

17. The variable diameter discharge system of claim 16, further comprising a plurality of hinges connected to the ring member, wherein the inner end of each of the guide members is connected to one of the plurality of hinges.

18. The variable diameter discharge system of claim 17, wherein the ring member comprises an upper ring, a lower ring, and a gap between the upper ring and the lower ring, wherein the plurality of hinges are connected within the gap between the upper ring and the lower ring.

* * * * *